US005689948A

United States Patent [19]

Frutschi

[11] Patent Number: 5,689,948

[45] Date of Patent: Nov. 25, 1997

[54] METHOD OF OPERATING A REHEAT POWER PLANT WITH STEAM INJECTION

[75] Inventor: Hans-Ulrich Frutschi, Riniken, Switzerland

[73] Assignee: Asea Brown Boveri AG, Baden, Switzerland

[21] Appl. No.: 609,683

[22] Filed: Mar. 1, 1996

[30] Foreign Application Priority Data

Mar. 7, 1995 [DE] Germany ........................ 195 08 018.1

[51] Int. Cl.[6] .................................. F02C 3/30; F02C 7/12

[52] U.S. Cl. .................... 60/39.05; 60/39.17; 60/39.182; 60/39.55

[58] Field of Search ................................ 60/39.04, 39.05, 60/39.17, 39.182, 39.55, 728, 39.53

[56] References Cited

U.S. PATENT DOCUMENTS

| | | | |
|---|---|---|---|
| 4,507,914 | 4/1985 | Rice | 60/39.17 |
| 5,313,782 | 5/1994 | Frutschi | 60/39.17 |
| 5,329,758 | 7/1994 | Urbach et al. | 60/39.05 |

FOREIGN PATENT DOCUMENTS

| | | |
|---|---|---|
| 0319246A2 | 6/1989 | European Pat. Off. . |
| 0321809B1 | 5/1991 | European Pat. Off. . |
| 0462458A1 | 12/1991 | European Pat. Off. . |
| 0519304A1 | 12/1992 | European Pat. Off. . |
| 0619133A1 | 10/1994 | European Pat. Off. . |
| 4333439C1 | 2/1995 | Germany . |
| 3-217626A | 9/1991 | Japan . |

*Primary Examiner*—Louis J. Casaregola

*Attorney, Agent, or Firm*—Burns, Doane, Swecker & Mathis, L.L.P.

[57] ABSTRACT

In a method of operating a power station plant which essentially comprises a gas-turbine group and a waste-heat steam generator (14) arranged downstream, the exhaust gases from said gas-turbine group, which essentially comprises a compressor (1),tcw a first combustion chamber (4), a first turbine (7), a second combustion chamber (9), a second turbine (12) and a generator (19), are directed through said waste-heat steam generator (14). The superheated steam (15) arising there is injected at a suitable point into the gas-turbine group. The saturated steam (16) arising there flows via a heat exchanger (17) through which a portion of compressor air (18) flows. The saturated steam (16) is converted into superheated steam (25) which is subsequently likewise injected into the gas-turbine group. The measures increase the efficiency and multiply the specific output of the plant.

10 Claims, 4 Drawing Sheets

METHOD OF OPERATING A REHEAT POWER PLANT WITH STEAM INJECTION

BACKGROUND OF THE INVENTION

1. Field of the Invention

The present invention relates to a method of operating a power station plant according to the preamble of claim 1.

2. Discussion of Background

EP-0 462 458 A1 has disclosed a power station plant which essentially comprises a gas-turbine group, a waste-heat steam generator arranged downstream, and an injector system. The components of said gas-turbine group, as an autonomous unit, comprise a generator, a compressor, a combustion chamber and a turbine. The exhaust gases from the turbine are fed to the waste-heat steam generator, where they continue to be utilized in an energetic manner. From the released thermal energy from these exhaust gases, high-pressure steam is generated in a high-pressure part of the waste-heat steam generator, which high-pressure steam is fed to the said injector system and is admitted to its driving nozzle there. Compressed air from the compressor is directed into the receiving nozzle of this injector system: this air is further compressed by the action of the driving nozzle. If the waste-heat steam generator is designed as a dual-pressure boiler, the steam prepared in the low-pressure part is fed, for example, to the combustion chamber. The ultimate purpose of these measures is primarily to minimize the pollutant emissions, in particular the NOx emissions. Besides, the fact of the matter is that, although the specific output of the plant increases, the efficiency gain remains relatively modest, so that such a plant does not constitute an alternative to a fully formed combined-cycle plant with regard to efficiency and also specific output.

SUMMARY OF THE INVENTION

Accordingly, one object of the invention, in a method of the type mentioned at the beginning, is to greatly increase the efficiency and the specific output by feedback of steam quantities into the gas-turbine group.

The basic circuit of the gas-turbine group is designed for sequential combustion. Such a gas-turbine group, to a very special degree, is surprisingly suitable for the injection of steam in its circuit, which steam is generated in a waste-heat steam generator arranged downstream. The outputs achievable here, depending on the cycle arrangement, are higher than the output of such a gas-turbine group without steam injection by a factor of two to three. Furthermore, the efficiency in such a gas-turbine group operated with steam injection reaches values which very closely approach those which can be achieved with the best combined-cycle plants.

An important advantage of the invention may be seen in the fact that the specific costs of such a gas-turbine group with steam injection turn out to be substantially lower than those of a combined-cycle plant, thus resulting in very lucrative prospects.

A further advantage of the invention may be seen in the fact that the water consumption of such a plant is only about two-thirds of that of a modern steam power plant with wet cooling tower; the water consumption of this plant is approximately of the same order of magnitude as that of a combined-cycle plant of the same output. Although it is true that the water for this must undergo partial processing, its costs turn out to be so insignificant that they have virtually no effect on the power generation costs.

The low specific costs of construction to be expected, the high efficiency and the possibility of quick start-up and loading also predestine this concept for medium- and peak-load operation. However, the main field of application is probably base-load operation.

Advantageous and expedient further developments of the achievement of the object according to the invention are defined in the further claims.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
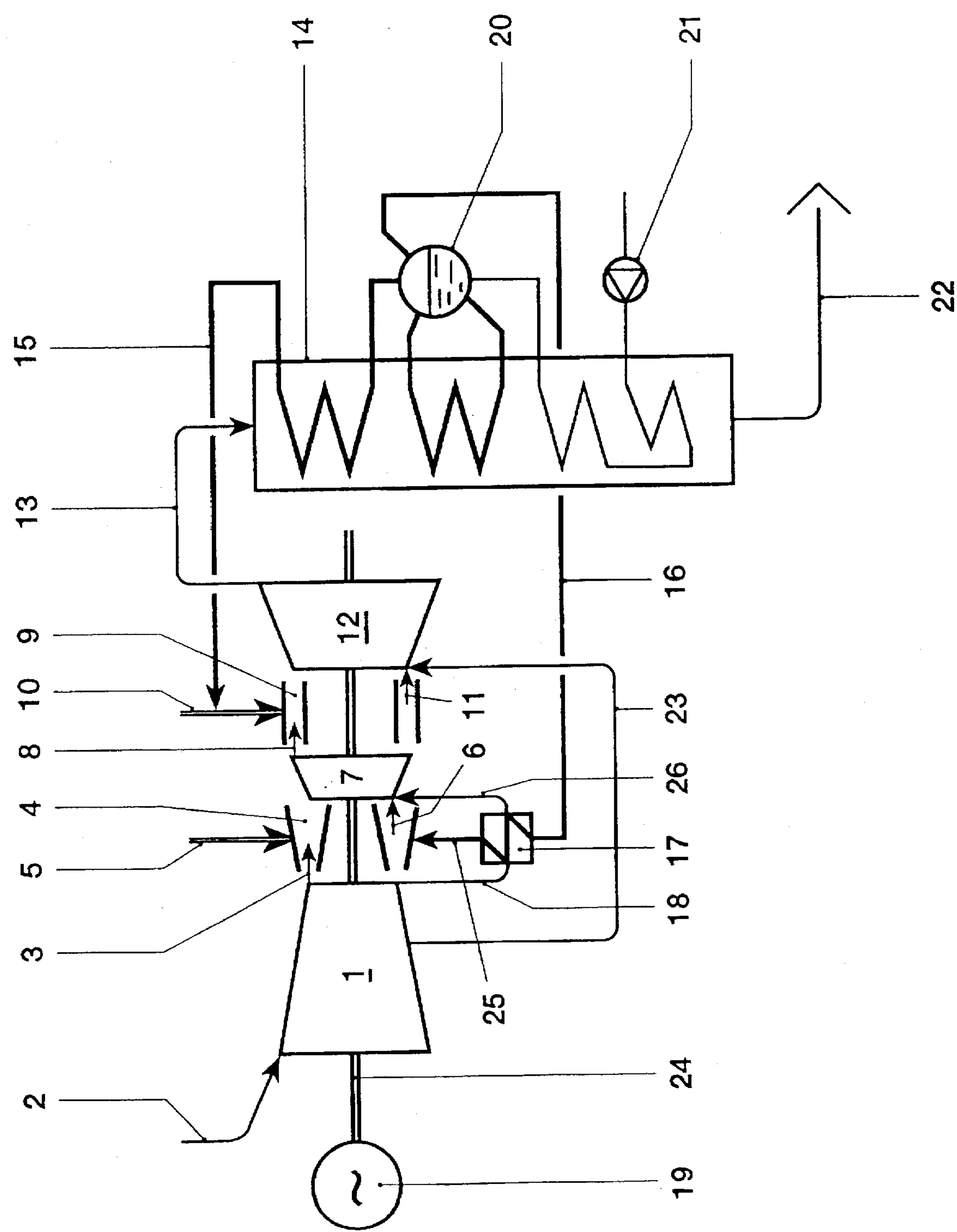
FIG. 1 shows a circuit of a gas-turbine group with sequential combustion, having a waste-heat steam generator and steam injection at a suitable point into the gas-turbine group.

Referring now to the drawings, wherein like reference numerals designate identical or corresponding parts throughout the several views, all elements not required for directly understanding the invention are omitted and the direction of flow of the media is indicated by arrows, FIG. 1 shows a gas-turbine group which is in operative connection with a waste-heat steam generator 14, the steam prepared in this waste-heat steam generator 14 being injected at a suitable point into the gas-turbine group. Of the fuels used, the following may be said: the requisite fuel may be provided, for example, by coal gasification interacting with the gas-turbine group. It is of course also possible to obtain the fuels used from a primary network. If a gaseous fuel for operating the gas-turbine group is supplied via a pipeline; the potential from the pressure and/or temperature difference between primary network and consumer network may be recuperated for the requirements of the gas-turbine group, or the plant in general. The gas-turbine group, as an autonomous unit, consists of a compressor 1, a first combustion chamber 4 arranged downstream of the compressor 1, a first turbine 7 arranged downstream of this combustion chamber 4, a second combustion chamber 9 arranged downstream of this turbine 7, and a second turbine 12 arranged downstream of this combustion chamber 9. Said turbomachines 1, 7, 12 have a common rotor shaft 24 which is coupled by a coupling (not shown) to the shaft (likewise not shown) of a generator 19. This rotor shaft 24 is preferably mounted on two bearings (not shown) which are placed on the head side of the compressor 1 and downstream of the second turbine 12. Depending on the design, the compressor stage, for example in order to increase the specific power, may be subdivided into two sectional compressors (not shown). After it is compressed, the intake air 2 preferably flows into a casing (not shown) which includes the compressor outlet and the first turbine 7. Also accommodated in this casing is the first combustion chamber 4, which is preferably designed as a continuous annular combustion chamber and into which the compressed air 3 flows. The compressed air to the first combustion chamber 4 may of course be provided from an air accumulator system (not shown). On the head side, the annular combustion chamber 4 has a number of burners (not shown) distributed over the periphery, which burners maintain the combustion. Diffusion burners may be used here per se. For reducing the pollutant emissions, in particular as far as the NOx emissions are concerned, and for increasing the efficiency, it is advantageous to provide an arrangement of premix burners according to EP-0 321 809 B1, the patent subject matter from this publication being an integral part of this description; in addition, this also applies with regard to the type of fuel feed described there and the composition of the combustion air, for example enriched with a recycled flue gas, which in the present FIG. 1 is symbolized by the arrow 5. With regard to the type of feed and the composition of the combustion air, this also applies to the second combustion chamber 9. As far as the arrangement of these premix burners in the peripheral direction of the annular combustion chamber 4 is concerned, such an arrangement may differ from the conventional configuration of identical burners if required; premix burners of different size may be used instead. This is preferably done in such a way that a small premix burner of the same configuration is disposed in each case between two large premix burners. The size of the large premix burners, which perform the function of main burners, in relation to the small premix burners, which are the pilot burners of this annular combustion chamber 4, is established from case to case with regard to the combustion air passing through them, that is, the compressed air 3 from the compressor 1. The pilot burners work as independent premix burners over the entire load range of the annular combustion chamber 4, the air coefficient remaining virtually constant. The main burners are switched on and off according to certain provisions specific to the plant. Since the pilot burners can be run on an ideal mixture over the entire load range, the NOx emissions are very low even at part load. In such a configuration, the encircling flow lines in the front region of the annular combustion chamber 4 come very close to the vortex centers of the pilot burners, so that an ignition per se is only possible with these pilot burners. During run-up, the fuel quantity 5 which is fed via the pilot burners is increased until the pilot burners are modulated, i.e. until the full fuel quantity is available. The configuration is selected in such a way that this point corresponds to the respective load-disconnection conditions of the gas-turbine group. The further power increase is then effected via the main burners. At the peak load of the gas-turbine group, the main burners are therefore also fully modulated. Since the configuration of "small" hot vortex centers, which is initiated by the pilot burners, between the "large" cooler vortex centers originating from the main burners turns out to be extremely unstable, very good burn-out with low CO and UHC emissions in addition to the NOx emissions is achieved even in the case of main burners operated on a lean mixture in the part-load range, i.e. the hot vortices of the pilot burners penetrate immediately into the small vortices of the main burners. The annular combustion chamber 4 may of course consist of a number of individual tubular combustion spaces which if need be are arranged in an inclined annular shape, sometimes also helically, around the rotor axis. This annular combustion chamber 4, irrespective of its design, is and may be arranged geometrically in such a way that it has virtually no effect on the rotor length. The resulting advantages from such a disposition will be dealt with in more detail further below. The hot gases 6 from this annular combustion chamber 4 are admitted to the first turbine 7 arranged directly downstream, the thermally expanding action of which on the hot gases 6 is deliberately kept to a minimum, i.e. this turbine 7 will accordingly consist of no more than one to two rows of moving blades. In such a turbine 7 it will be necessary to provide pressure compensation at the end faces for the purpose of stabilizing the axial thrust. The hot exhaust gases 8 partially expanded in turbine 7 and directly flowing into the second combustion chamber 9 are at quite a high temperature for the reasons explained; for specific operational reasons the design is preferably to allow for a temperature which is certainly still around 1000° C. This second combustion chamber 9 essentially has the form of a continuous annular, axial or quasi-axial cylinder; this combustion chamber 9 may of course also consist of a number of axially, quasi-axially or helically arranged and self-contained combustion spaces. As far as the configuration of the annular combustion chamber 9 consisting of a single combustion space is concerned, a plurality of fuel lances, symbolized in FIG. 1 by arrow 10, are disposed in the peripheral direction of this annular cylinder, in which case they may of course be connected to one another via a ring main (not shown). This combustion chamber 9 has no burners per se; the combustion of the fuel 10 injected into the hot exhaust gases 8 coming from the turbine 7 takes place here by self-ignition, if indeed the temperature level permits such a mode of operation. Starting from the assumption that the combustion chamber 9 is operated with a gaseous fuel, that is, for example, natural gas, the temperature of the hot gases 8 from the turbine 7 must be around 1000° C. for self-ignition. Accordingly, in order to ensure self-ignition of a natural gas in the combustion chamber 9, the outlet temperature of the hot exhaust gases 8 from the turbine 7 must still be very high, around 1000° C. as explained above, and this of course must also be the case during part-load operation, a factor which plays a causal role in the design of this turbine 7. In order to ensure the operational reliability and a high efficiency in the case of a combustion chamber designed for self-ignition, it is of the utmost importance that the flame front remains locally stable. For this purpose, a number of vortex generators (not shown in the figure), disposed in the peripheral direction, are provided in this combustion chamber 9, preferably on the inner and outer wall, which vortex generators are placed in the axial direction preferably upstream of the fuel lances 10. The task of these vortex generators is to produce vortices which induce a backflow zone, analogous to that from the premix burners in the annular combustion chamber 4. Since this combustion chamber 9, on account of the axial arrangement and the overall length, is a high-velocity combustion chamber, the average velocity of which is greater than about 60 m/s, the vortex-producing elements, that is, the vortex generators, must be designed to conform to the flow. On the inflow side, these elements are to preferably consist of a tetrahedral shape having inclined surfaces with respect to the inflow. The vortex-producing elements may be placed on either the outer surface or the inner surface of the combustion chamber 9, or may act on either side. The inclined surfaces between the outer and inner vortex-producing elements are preferably arranged in mirror image in such a way that the cross section of flow in the combustion chamber 9 undergoes a vortex-producing expansion downstream of this location in the region of the injection of the fuel 10. The vortex-producing elements may of course also be displaced axially relative to one another. The outflow-side surface of the vortex-producing elements is essentially of radial design so that a backflow zone appears starting from this location. With regard to the specific configuration of the vortex generators, reference is made to publication EP-0 619 133 A1, which is an integral part of this description. However, the self-ignition in the combustion chamber 9 must also continue to be assured in the transient load ranges as well as in the part-load range of the gas-turbine group, i.e. auxiliary measures must be provided which ensure the self-ignition in the combustion chamber 9 even if the temperature of the hot exhaust gases 8 in the region of the injection of the fuel 10 should possibly vary. In order to ensure reliable self-ignition of the gaseous fuel 10 injected into the combustion chamber 9, a small quantity of another fuel having a lower ignition temperature is added to this fuel. Fuel oil, for example, is very suitable here as "auxiliary fuel". The liquid auxiliary fuel, appropriately injected, performs the task of acting so to speak as a fuse and initiates self-ignition in the combustion chamber 9 even if the hot exhaust gases 8 from the first turbine 7 should assume a temperature below the desired optimum level. This measure of providing fuel oil for ensuring self-ignition certainly always proves to be especially appropriate when the gas-turbine group is operated at reduced load. Furthermore, this measure is a decisive factor in enabling the combustion chamber 9 to have a minimum axial extension. The short overall length of the combustion chamber 9, the action of the vortex generators considered for stabilizing the flame and also the continual guarantee of self-ignition are responsible for causing the combustion to be effected very quickly, and the dwell time of the fuel in the region of the hot flame front remains minimal. An effect resulting herefrom which is directly measurable from the combustion relates to the NOx emissions, which are minimized in such a way that they are now no longer relevant. Furthermore, this initial situation enables the location of the combustion to be clearly defined, which is reflected in optimized cooling of the structures of this combustion chamber 9. The hot gases 11 prepared in the combustion chamber 9 are then admitted to a second turbine 12 arranged downstream. The thermodynamic characteristics of the gas-turbine group may be designed in such a way that the exhaust gases 13 from the second turbine 12 still have so much thermal potential to thus operate a waste-heat steam generator 14 arranged downstream. As already pointed out in the description of the annular combustion chamber 4, this annular combustion chamber 4 is arranged geometrically in such a way that it has virtually no effect on the rotor length. Furthermore, it could be established that the second combustion chamber 9 occupies a minimum length between the outflow plane of the first turbine 7 and the inflow plane of the second turbine 12. Furthermore, since the expansion of the hot gases 6 in the first turbine 7, for reasons explained, takes place over few rows of moving blades, a gas-turbine group can be provided whose rotor shaft 24 can be supported on only two bearings (not shown) on account of its minimized length. On the compressor side, the rotor shaft 24 has a coupling (not shown) which serves to deliver power. It is of advantage for increasing the efficiency of the gas-turbine group if a small diffuser (not shown in the figure) is provided in front of the second combustion chamber 9. The total pressure loss in the entire system could therefore be reduced. It can be shown from the conventional diffuser design diagrams that large recovery rates of the dynamic pressure can be achieved even at a minimum length of the diffuser. As explained above, the compressor stages may be equipped with intermediate cooling. In order not to alter the basic geometric conception of the gas-turbine group, as set out in the figure, when establishing the basis for intermediate cooling, it is proposed to provide an intermediate cooler (not shown in the figure) which is placed inside the stator casing and right in the direction of flow of the compressor stages. The cooling in this intermediate cooler takes place indirectly or directly. In the case of direct intermediate cooling, this may be effected, for example, by a unit whose operation is designed for the evaporation of the injected water. Thus a configuration is obtained such that conventional connecting lines to an intermediate cooler placed outside the stator casing and from this intermediate cooler back through the stator casing to the next compressor stage are completely dispensed with. As already explained, the exhaust gases 13 from the second turbine 12 flow through the waste-heat steam generator 14, which is supplemented by at least one drum 20 and a feedwater pump 21. The exhaust gases 13 utilized thermally in the waste-heat steam generator 14 then flow further as flue gases 22. The subcritically working waste-heat steam generator 14 provides two types of steam: a portion of superheated steam 15 is directly injected into the narrower or wider region of the second combustion chamber 9 or into the first combustion chamber 4, as apparent from FIG. 2. A further portion is removed from the drum 20 as saturated steam 16, whereby the evaporation has already taken place, and then flows first of all through a heat exchanger 17. A portion of compressed air 18 diverted from the compressor 1 flows through this heat exchanger 17 on the other side, for example in counterflow principle. The saturated steam 16 is therefore superheated in the heat exchanger 17 by compressor heat, whereby 100% energy recovery takes place. An energy recovery also takes place on the other side, which energy recovery, apart from the temperature difference in the heat exchanger 17, is likewise a complete recovery. In the case of this circuit it has to be taken into account that only a portion of the saturated steam arising can be superheated in the heat exchanger 17, and of the steam arising in the waste-heat steam generator 14 about 70% is used as superheated steam 15 and about 30% as saturated steam 16. The steam 15 superheated in the waste-heat steam generator 14 flows into the second combustion chamber 9 and brings about a sharp increase in the output and efficiency of such a plant. The compressor air cooled down in the heat exchanger 17 then serves as high-quality cooling air 26 for the units of the plant which are exposed to high thermal loading. Here, the figure shows, for example, the introduction of the cooling air 26 into the first turbine 7. Furthermore, the figure shows the partial extraction of further compressor air 23 which is used as cooling air, for example, for the second turbine 12. In the case of this compressor air 23, too, a heat exchange in the above sense can be effected by a further heat exchanger being provided which performs the same function as the heat exchanger 17. The outputs attainable here, depending on the cycle arrangement, are higher than the output of the gas-turbine group without steam injection by a factor of 2 to 2.5. In this case, the efficiency reaches values which very closely approach those which can be achieved with the best combined-cycle plants. Since the specific costs of such a gas-turbine group having steam injection are substantially lower than than those of a combined-cycle plant, this results in a plant which is highly acceptable economically. This surprising effect is closely connected with a sequentially fired gas-turbine group, for here, in contrast to the conventional gas-turbine groups, the steam can first of all expand over a large steam gradient, and furthermore the injected steam is also inevitably reheated, and finally a very high and high-grade quantity of steam is produced by the high temperature of the exhaust gases 13 from the second turbine 12.

Figure 2:
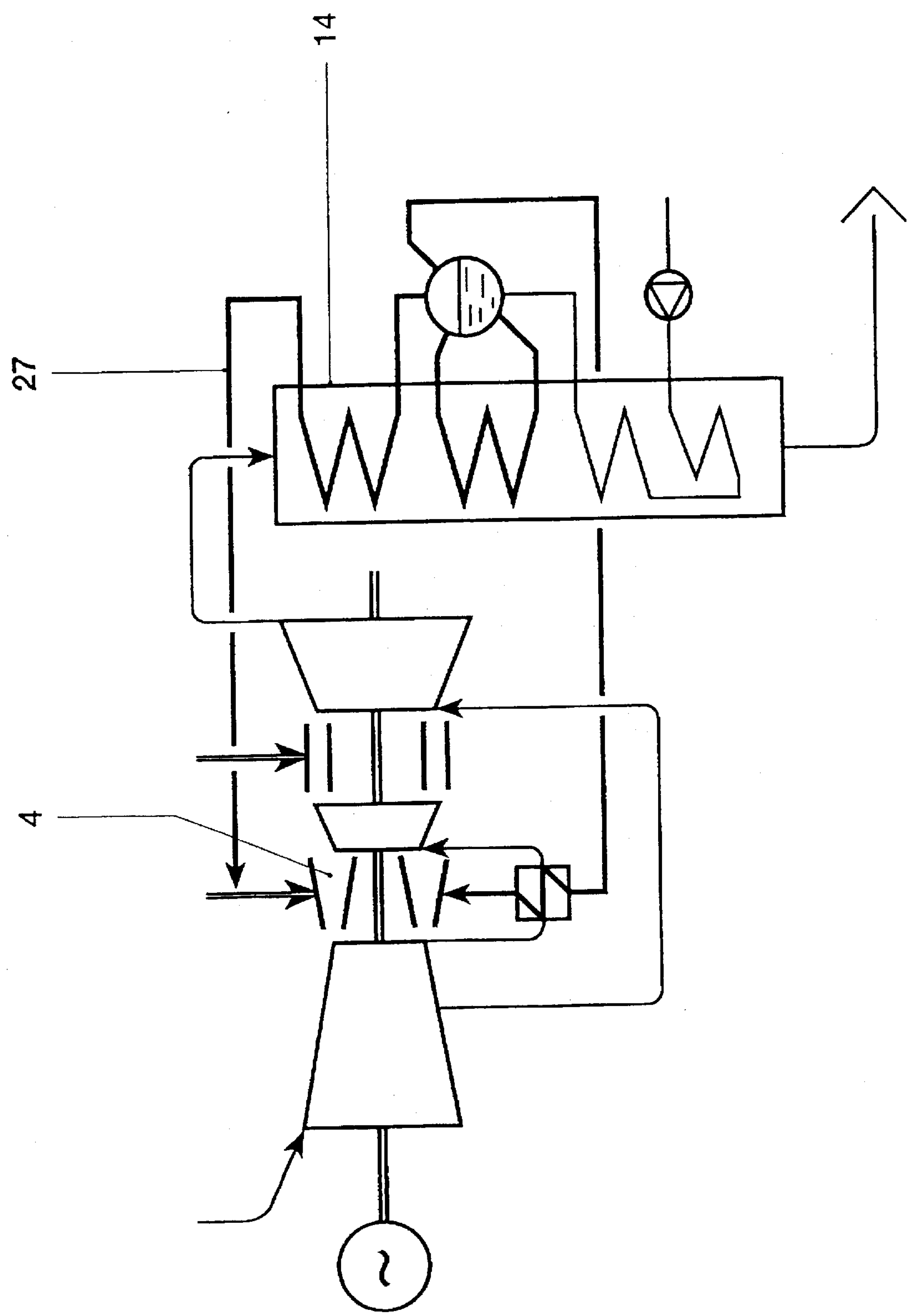
FIG. 2 shows a further circuit according to FIG. 1, having modified steam injection.

The differences between FIG. 2 and FIG. 1 have already been considered above: the superheated steam 27 directly generated in the waste-heat steam generator 14 is injected into the narrower or wider region of the first combustion chamber 4. There are no further differences in the circuit.

Figure 3:
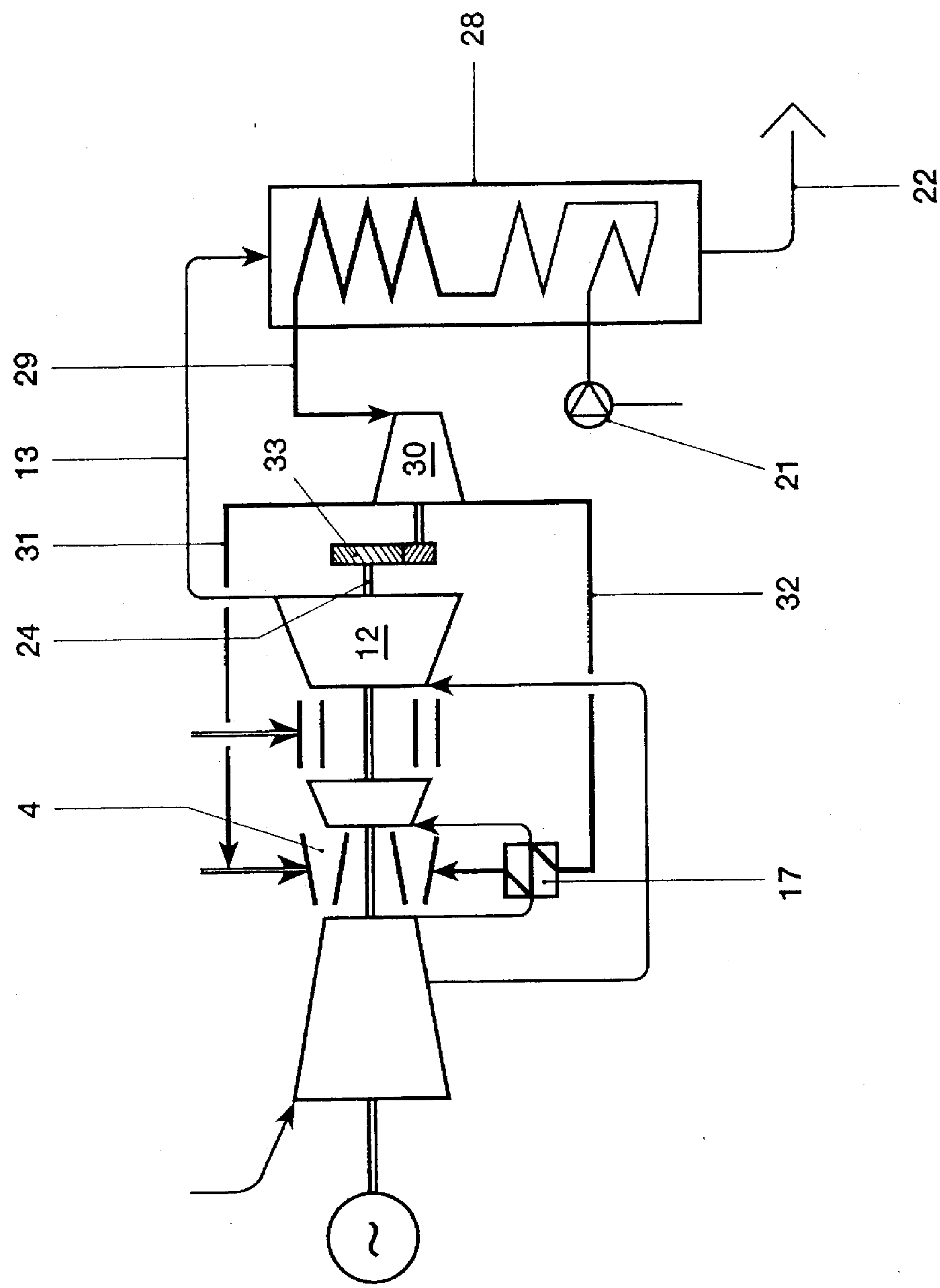
FIG. 3 shows a further circuit according to FIG. 1, having a steam turbine connected in between, and FIG. 4 shows a further circuit according to FIG. 3, the back-pressure steam flowing out of the steam turbine being reheated.

FIG. 3 shows an arrangement largely according to FIG. 1, but here steam at a preferably subcritical pressure is used. Here, too, the exhaust gases 13 from the second turbine 12 flow through a waste-heat steam generator 28, although the latter has no drum. The superheated steam 29 arising therefrom is first of all admitted to a steam turbine 30, which is connected to the rotor shaft 24 via gearing 33. A portion of the back-pressure steam 31 flows directly from the said steam turbine 30 into the narrower or wider region of the first combustion chamber 4, while another portion of the back-pressure steam 32 undergoes the same superheating according to FIG. 1 or FIG. 2 before it is likewise injected on the outflow side of the heat exchanger 17 into the first combustion chamber 4. This arrangement permits a more pronounced increase in output compared with the arrangement according to FIG. 2 up to a factor of 3 above the output of the gas-turbine group, the efficiency being retained at approximately the same level.

Figure 4:
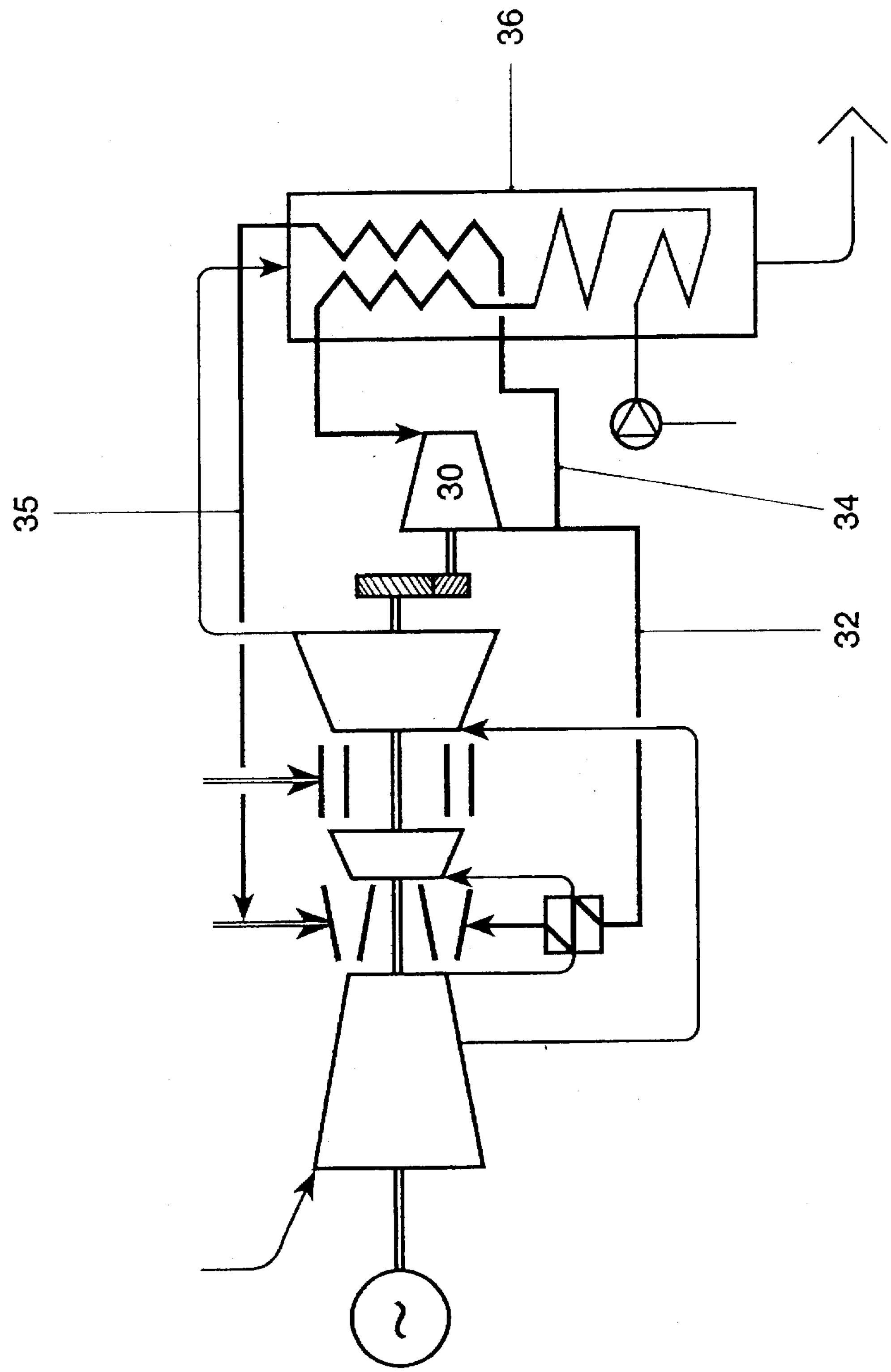

FIG. 4 shows a further arrangement which results in a further remarkable increase in efficiency, although at reduced specific work. A portion 34 of the back-pressure steam 32 from the steam turbine is fed back into a waste-heat steam generator 36 of appropriate design and is reheated there before this steam 35 is injected at a suitable point into the gas-turbine group. The remaining back-pressure steam 32 is likewise superheated in a conventional manner (cf. FIGS. 1–3) and is injected into the gas-turbine group at a suitable point.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of operating a power station plant which includes a gas-turbine group and a waste-heat steam generator arranged downstream through which exhaust gases from the gas-turbine group flow, the gas-turbine group including a compressor unit, a first combustion chamber acting downstream of the compressor unit, a first turbine acting downstream of the first combustion chamber, a second combustion chamber acting downstream of the first turbine, and a second turbine acting downstream of the second combustion chamber, the combustion chambers being operated with a fuel, comprising the steps of injecting a portion of the steam produced in the waste-heat steam generator downstream of the compressor unit, directing another portion of the steam produced in the waste-heat steam generator through at least one heat exchanger through which compressor air flows to heat said another portion of the steam, and injecting steam from said heat exchanger into a unit of the gas-turbine group downstream of the compressor unit.

2. The method as claimed in claim 1, further comprising adding at least a portion of the steam produced in the waste-heat steam generator to the fuel of at least one combustion chamber of said a gas-turbine group.

3. The method as claimed in claim 1, further comprising directing at least a portion of the steam produced in the waste-heat steam generator into at least one combustion chamber of said gas-turbine group downstream of the compressor unit.

4. The method as claimed in claim 1, further comprising cooling a unit downstream of the compressor unit which is exposed to high thermal loading with the compressor air cooled down in the heat exchanger.

5. The method as claimed in claim 1, further comprising driving the injection of fuel into a combustion chamber of said gas-turbine group with steam selected from the group consisting of a portion of superheated steam from said waste-heat steam generator, saturated steam, and back-pressure steam.

6. The method as claimed in claim 1, wherein back-pressure steam flows out of a steam turbine which acts downstream of the waste-heat steam generator, said steam turbine operated with at least a portion of superheated steam arising in the waste-heat steam generator.

7. The method as claimed in claim 1, further comprising directing a portion of back-pressure steam flowing out of a steam turbine into the gas-turbine group.

8. The method as claimed in claim 1, further comprising operating a steam turbine as a component of a steam cycle arranged downstream of the gas-turbine group, and originating the steam of this steam cycle from the waste-heat steam generator which is operated with the exhaust gases from the gas-turbine group.

9. The method as claimed in claim 1, further comprising directing the superheated steam arising from the first heat exchanger into the first combustion chamber, and directing superheated steam arising from a second heat exchanger into the second combustion chamber.

10. The method as claimed in claim 1, further comprising self-igniting the second combustion chamber.

* * * * *